United States Patent Office
3,013,012
Patented Dec. 12, 1961

3,013,012
ALKANOYLTHIO-17α-CARBOXYETHYL-17β-HYDROXYANDROSTEN-3-ONE LACTONES
John A. Cella, Lake Forest, and Robert C. Tweit, Wilmette, Ill., assignors to G. D. Searle & Co., Chicago, Ill., a corporation of Delaware
No Drawing. Filed Dec. 22, 1960, Ser. No. 77,517
11 Claims. (Cl. 260—239.57)

This invention relates to alkanoylthio-17α-carboxyethyl-17β-hydroxyandrosten-3-one lactones, or compounds corresponding, and processes for the manufacture thereof. More particularly, this invention relates to 1-(lower alkanoyl)thio, 7-(lower alkanoyl)thio, and 1,7-di-(lower alkanoyl)thio lactones of the formula

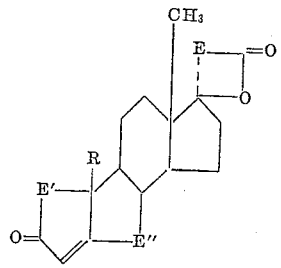

wherein E represents an ethylene or vinylene radical; E' represents an ethylene, vinylene, or (lower alkanoyl)thioethylene radical; E" represents an ethylene, vinylene (lower alkanoyl)thioethylene, or (lower alkanoyl)thiopropylene radical; and R represents a methyl radical except when E' and E" represent ethylene and (lower alkanoyl)thioethylene radicals, respectively, in which case R represents either a methyl radical or hydrogen. It will be understood from the foregoing disclosure that the compounds of this invention are unexceptionably characterized by the presence of a (lower alkanoyl)thio side-chain on one or both of the carbons at positions 1 and 7 in the steroid nucleus.

The application for Letters Patent securing the invention herein described and claimed is a continuation-in-part of applicants' prior copending application, Serial No. 779,853, filed December 12, 1958, now abandoned.

By "(lower alkanoyl)thio" herein is meant a radical of the formula

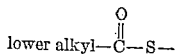

the alkyl constituent being such as methyl, ethyl, propyl, isopropyl, isobutyl, sec-butyl, tert-butyl, pentyl, isopentyl, tert-pentyl, neopentyl, hexyl, isohexyl, heptyl, and like $C_nH_{2n+1}$ radicals wherein $n$ is a positive integer amounting to less than 9.

It follows from the above that when, for example, both E' and E" represent (lower alkanoyl)thioethylene radicals, compounds of the formula

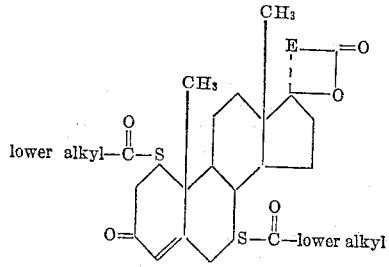

are specified, E being defined as before and the sulfur-containing substituents at 1 and 7 being either in the α or β configuration. Similarly and further by way of illustration, when E' represents ethylene and E" represents (lower alkanoyl)thioethylene, compounds of the formula

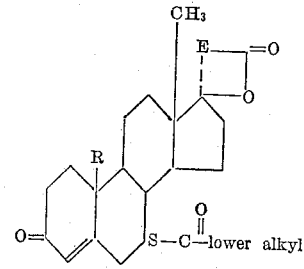

are specified, E being as before and R in this circumstance representing either a methyl radical or hydrogen. Finally, when E' represents, let us say, ethylene and E" represents (lower alkanoyl)thiopropylene, the compounds specified have the formula

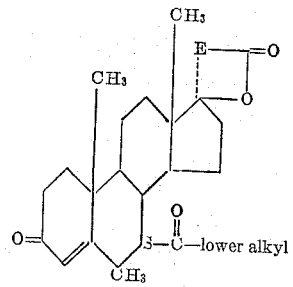

E again being as before and the configuration of the substituents at 6 and 7 being either α or β, though the α configuration is usual for the 6-methyl radical.

Assignment of configurations at positions 1, 6, and 7 in the instant compositions is based upon analyses of molecular rotation data.

Equivalent to the subject lactones for purposes of this invention are the corresponding hydroxy acids and their salts, of the formula

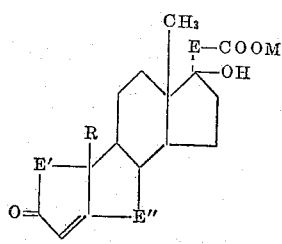

wherein E, E', E", and R are as previously defined and M represents hydrogen, an alkali or alkaline earth metal, or the ammonium radical.

The lactones, hydroxy acids, and salts hereinbefore described are useful because of their valuable pharmacological properties. Among other things, they are diuretic agents, and adapted to block the effect of desoxycorticosterone acetate on urinary sodium and potassium.

The compounds of this invention can be manufactured by heating a thioalkanoic acid of the formula

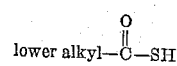

with an appropriate steroid of the formula

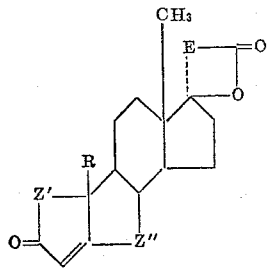

E having the meaning assigned above; Z' being so selected from among ethylene and vinylene radicals and Z" from ethylene, vinylene, and methylvinylene radicals that at least one of Z' and Z" is always unsaturated; and R being a methyl radical when Z' is vinylene, otherwise either a methyl radical or hydrogen. A solvent medium can be employed, if desired, and ultraviolet irradiation can be used to increase reaction rates.

The starting materials for this process of manufacture are with two exceptions obtained as described in United States Patent No. 2,900,383. The exceptions: 17α-(2-carboxyethyl) - 17β - hydroxy - 19 - norandrost - 4 - en-3-one lactone, the starting material for Example 8A hereafter, is obtained as described in United States Patent No. 2,918,463; and 17α-(2-carboxyethyl)-17β-hydroxy-6β-methylandrost-4-en-3-one lactone, the starting material for Example 9A, is obtained as described in United States Patent No. 2,938,031.

Those skilled in the art will readily appreciate that the described lactones, on contact with appropriate aqueous bases [e.g., KOH, NaOH, NH₄OH, Ca(OH)₂, etc.], are converted to salts of the corresponding hydroxy acids, from which the free acids can be obtained by a critically brief exposure to a proton source. Prolongation of the exposure time induces lactonization.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

1 - acetylthio - 17α - (2 - carboxyethyl) - 17β - hydroxyandrost-4-en-3-one lactone.—A mixture of 1 part of 17α - (2 - carboxyethyl) - 17β - hydroxyandrosta - 1,4-dien-3-one lactone and 1 part of thioacetic acid is heated at approximately 90° for ½ hour. The bulk of the excess thioacetic acid is then evaporated under nitrogen and the residue crystallized from a mixture of ethyl acetate and ether. Recrystallization from ethyl acetate affords 1α - acetylthio - 17α - (2 - carboxyethyl) - 17β - hydroxyandrost-4-en-3-one lactone melting at approximately 199–200° (with decomposition) and which has the formula

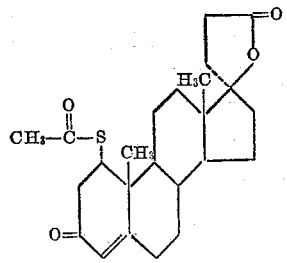

From the combined mother liquors remaining after crystallization and recrystallization of 1α-acetylthio-17α-

(2 - carboxyethyl) - 17β - hydroxyandrost - 4 - en - 3-one lactone as hereinbefore described, upon evaporation of solvent and chromatographic purification via silica gel absorption, using benzene and ethyl acetate as developing solvents, there is obtained 1β-acetylthio-17α-(2-carboxyethyl)-17β-hydroxyandrost-4-en-3-one lactone, of the formula

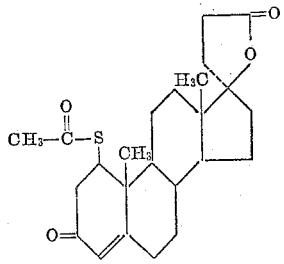

EXAMPLE 2

17α - (2-carboxyethyl) - 17β - hydroxy - 1α - propionylthioandrost-4-en-3-one lactone.—A mixture of 7 parts of 17α-(2-carboxyethyl)-17β-hydroxyandrosta-1,4-dien-3-one lactone and 10 parts of thiopropionic acid is heated at approximately 90° for 1 hour. Ethyl acetate and sufficient hexane to induce crystallization are added, and the product which separates is further purified by recrystallization from a mixture of benzene and hexane. The 17α - (2-carboxyethyl)-17β-hydroxy-1α-propionylthioandrost-4-en-3-one lactone thus obtained melts at 176–178° (with decomposition) and has the formula

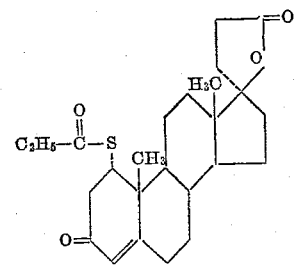

EXAMPLE 3

7 - acetylthio - 17α - (2 - carboxyethyl) - 17β - hydroxyandrost-4-en-3-one lactone.—A mixture of approximately 11 parts of 17α-(2-carboxyethyl)-17β-hydroxyandrosta-4,6-dien-3-one lactone and 10 parts of thioacetic acid is heated at 85–95° for ½ hour. Excess thioacetic acid is removed by vacuum distillation at this point, and the residue is twice recrystallized from methanol, affording 7α - acetylthio - 17α - (2 - carboxyethyl) - 17β-hydroxyandrost-4-en-3-one lactone, melting at approximately 134–135°. Heated above this melting point, the product solidifies and melts again at approximately 201–202° (with decomposition). 7α - acetylthio - 17α - (2 - carboxyethyl)-17β-hydroxyandrost-4-en-3-one lactone has the formula

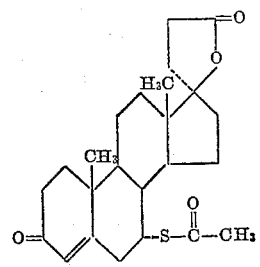

From the first methanolic mother liquor remaining after crystallization of 7α-acetylthio-17α-(2-carboxyethyl)-17β-hydroxyandrost-4-en-3-one lactone as hereinbefore described, upon concentration to approximately ½ volume and chilling, there precipitates 7β-acetylthio-17α - (2 - carboxyethyl) - 17β - hydroxyandrost - 4 - en- 3-one lactone which, further purified by recrystallization from methanol, melts at 227–230°. This material has the formula

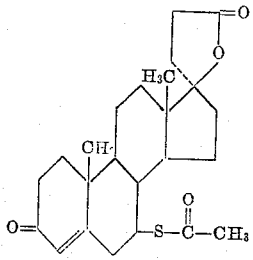

Whereas the specific rotation (1% in chloroform solution) of 7α-acetylthio-17α-(2-carboxyethyl)-17β-hydroxyandrost-4-en-3-one lactone is −33.5°, the 7β-acetylthio isomer is characterized by a specific rotation of +61°.

EXAMPLE 4

*17α - (2 - carboxyethyl) - 17β - hydroxy - 7α - propionylthioandrost-4-en-3-one lactone.*—A mixture of 13 parts of 17α-(2-carboxyethyl)-17β-hydroxyandrosta-4,6-dien-3-one lactone and 10 parts of thiopropionic acid is heated at 90° for ½ hour. Work-up as detailed in the preceding Example 3 affords 17α-(2-carboxyethyl)-17β-hydroxy - 7α - propionylthioandrost - 4 - en - 3 - one lactone, melting at 192.5–194°. The product has the formula

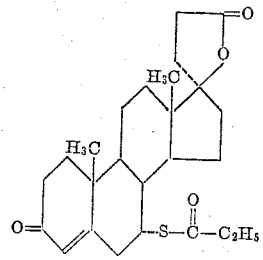

EXAMPLE 5

*17α - (2 - carboxyethyl) - 17β - hydroxy - 7α - octanoylthioandrost-4-en-3-one lactone.*—A mixture of 1 part of 17α - (2 - carboxyethyl) - 17β - hydroxyandrosta - 4,6-dien-3-one lactone and 1 part of thiooctanoic acid (preparable by substituting octanoic anhydride for acetic anhydride in the Organic Synthesis procedures for thiolacetic acid, volume 31, page 105 ff.) is heated at 85–95° for 2 hours, then cooled and diluted with approximately 50 parts of ether. The resultant solution is washed with aqueous sodium carbonate, dried over anhydrous sodium sulfate, and stripped of solvent by vacuum distillation. The residue is chromatographed on silica gel, using benzene and ethyl acetate as developing solvents. From an eluate comprising 5% ethyl acetate in benzene, on evaporation of solvent, there is obtained 17α - (2 - carboxyethyl) - 17β - hydroxy - 7α - octanoylthioandrost-4-en-3-one lactone as the residue, a "glass." The product has the formula

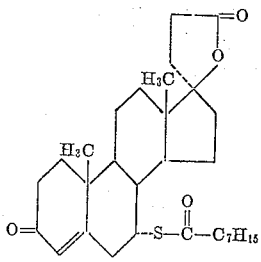

EXAMPLE 6

*1α,7α - diacetylthio - 17α - (2 - carboxyethyl) - 17β-hydroxyandrost - 4 - en - 3 - one lactone methanolate.*—

A mixture of 5 parts of 17α-(2-carboxyethyl)-17β-hydroxyandrosta-1,4,6-trien-3-one lactone monomethanolate and 10 parts of thioacetic acid is heated at 85–95° for 1 hour. Excess thioacetic acid is thereupon removed by vacuum distillation; and the residue is chromatographed on silica gel, using benzene and ethyl acetate as developing solvents. From an eluate comprising 10% ethyl acetate in benzene there is obtained, on evaporation of solvent, 1α,7α - diacetylthio - 17α - (2 - carboxyethyl)-17β-hydroxyandrost-4-en-3-one lactone as the residue. Upon dissolution of this material in methanol and removal of solvent by distillation, the monomethanolate results. 1α,7α - diacetylthio - 17α - (2 - carboxyethyl)-17β-hydroxyandrost-4-en-3-one lactone is characterized by a maximum in the ultraviolet spectrum at 237 mμ and peaks in the infrared spectrum at 3.4, 5.65, 5.9, 6.2, 7.4, 8.5, 8.8, and 10.5μ. It has the formula

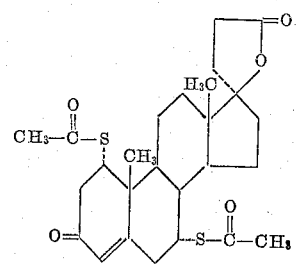

EXAMPLE 7

*1-acetylthio - 17α - (2-carboxyethyl) - 17β - hydroxyandrosta - 4,6 - dien-3-one lactone and 7-acetylthio-17α-(2-carboxyethyl)-17β-hydroxyandrostra-1,4-dien - 3 - one lactone.*— A solution of 10 parts of 17α-(2-carboxyethyl)-17β-hydroxyandrosta-1,4,6-trien-3-one lactone monomethanolate in a mixture of 3 parts of thioacetic acid and 750 parts of chloroform is irradiated with ultraviolet light for 3 hours. Chloroform is then removed by distillation under nitrogen; and the residue, dissolved in benzene, is subjected to column chromatography on 300 parts of silica gel. The column is consecutively washed with benzene and 5%, 8%, and 10% solutions of ethyl acetate in benzene, following which it is eluted with 12%, 15%, and 20% solutions of ethyl acetate in benzene. From the early eluates, on evaporation of solvent, there is obtained, preponderantly, 1α-acetylthio-17α-(2-carboxyethyl) - 17β - hydroxyandrosta-4,6-dien-3-one lactone, which is characterized by a maximum in the ultraviolet absorption spectrum at 287 mμ. The product has the formula

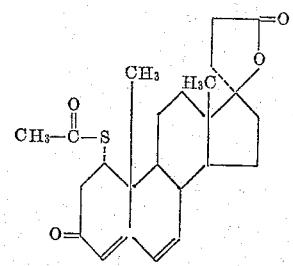

From later eluates, on evaporation of solvent, there is obtained 7α-acetylthio - 17α - (2-carboxyethyl)-17β-hydroxyandrosta-1,4-dien-3-one lactone, which melts at 180–183° and has the formula

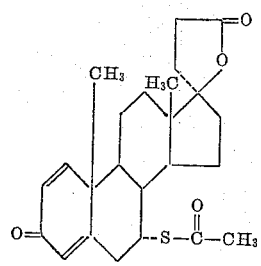

EXAMPLE 8

A. *17α-(2-carboxyethyl) - 17β - hydroxy-19-norandrosta-4,6-dien-3-one lactone.*—To a solution of 820 parts of chloranil in 87000 parts of xylene containing 1 part of p-toluenesulfonic acid monohydrate is added, with agitation at the boiling point under reflux, 1000 parts of 17α-(2-carboxyethyl)-17β-hydroxy - 19 - norandrost-4-en-3-one lactone. The lactone dissolves. The resultant solution is maintained at the boiling point under reflux for 1 hour and then cooled and chromatographed on silica gel, using benzene and ethyl acetate as developing solvents. There is isolated by this means the desired 17α-(2-carboxyethyl)-17β-hydroxy-19-norandrosta-4,6-dien - 3 - one lactone which, recrystallized from ethyl acetate, melts in the range 235–239°.

B. *7α-acetylthio-17α-(2-carboxyethyl)-17β-hydroxy-19-norandrost-4-en-3-one lactone.*—A mixture of 47 parts of 17α-(2-carboxyethyl) - 17β - hydroxy-19-norandrosta-4,6-dien-3-one lactone with 100 parts of thioacetic acid is heated at 80–95° for several hours. Excess thioacetic acid is removed by vacuum distillation; and the residue is recrystallized from methanol, affording 7α-acetylthio-17α-(2-carboxyethyl)-17β-hydroxy-19-norandrost - 4 en - 3-one lactone, melting at 111–113°. The product has the formula

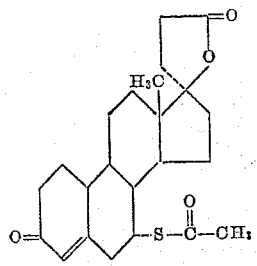

EXAMPLE 9

A. *17α-(2-carboxyethyl)-17β-hydroxy - 6 - methylandrosta-4,6-dien-3-one lactone.*—A solution of 5 parts of 17α-(2-carboxyethyl) - 17β - hydroxy-6β-methylandrost-4-en-3-one lactone and 5 parts of chloranil in 400 parts of xylene containing a trace of p-toluenesulfonic acid is heated at the boiling point of the solvent under reflux overnight. The solution is then stripped of solvent by vacuum distillation; and the residue is chromatographed on silica gel, using benzene and ethyl acetate as developing solvents. By this means there is isolated 17α-(2-carboxyethyl)-17β-hydroxy-6-methylandrosta - 4,6 - dien-3-one lactone, the melting point of which is 204–205°.

B. *7-acetylthio - 17α - (2-carboxyethyl)-17β-hydroxy-6-methylandrost-4-en-3-one lactone.*—A mixture of 11 parts of 17α-(2-carboxyethyl)-17β-hydroxy-6-methylandrosta-4,6-dien-3-one lactone and 10 parts of thioacetic acid is heated at 85–95° for ½ hour, whereupon excess thioacetic acid is removed by vacuum distillation and the residue is crystallized from ether, affording 7α-acetylthio-17α-(2-carboxyethyl)-17β-hydroxy - 6α - methylandrost-4-en-3-one lactone, melting at 237–240° (with decomposition). The product has the formula

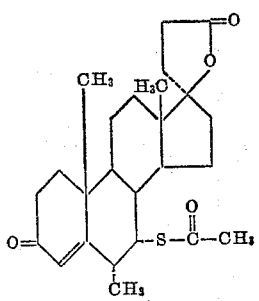

From the ethereal mother liquor remaining after crystallization of 7α-acetylthio-17α - (2-carboxyethyl)-17β-hydroxy-6α-methylandrost-4-en-3-one lactone as hereinbefore described, upon evaporation of solvent and chromatographic purification via silica gel absorption, using benzene and ethyl acetate as developing solvents, there is obtained 7β-acetylthio - 17α-(2-carboxyethyl)-17β-hydroxy - 6β-methylandrost - 4-en-3-one lactone, of the formula

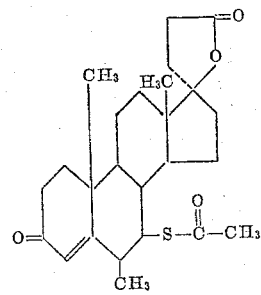

What is claimed is:
1. A steroid of the formula

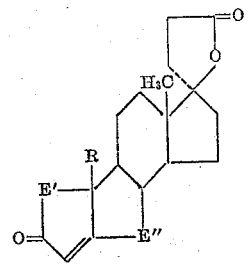

wherein E' is selected from the group consisting of ethylene, vinylene, and (lower alkanoyl) thioethylene radicals; E" is selected from the group consisting of ethylene, vinylene, (lower alkanoyl) thioethylene, and (lower alkanoyl) thiopropylene radicals; R is a methyl radical except when E' and E" are ethylene and (lower alkanoyl) thioethylene radicals, respectively, in which case R is selected from the group consisting of hydrogen and methyl radicals; and the selection of E' and E" is such that at least one (lower alkanoyl) thio radical is unexceptionably present in the steroid nucleus.

2. A compound of the formula

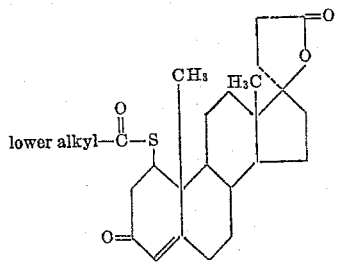

3. 1α - acetylthio-17α-(2-carboxyethyl) - 17β-hydroxyandrost-4-en-3-one lactone.

4. A compound of the formula

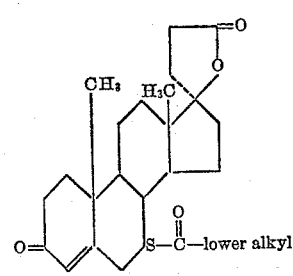

5. 7α-acetylthio-17α-(2-carboxyethyl)-17β-hydroxyandrost-4-en-3-one lactone.

6. 7β-acetylthio-17α-(2-carboxyethyl)-17β-hydroxyandrost-4-en-3-one lactone.

7. 1α,7α-diacetylthio-17α-(2-carboxyethyl)-17β-hydroxandrost-4-en-3-one lactone.

8. 1α-acetylthio-17α-(2-carboxyethyl)-17β-hydroxyandrosta-4,6-dien-3-one lactone.

9. 7α-acetylthio-17α-(2-carboxyethyl)-17β-hydroxyandrosta-1,4-dien-3-one lactone.

10. 7α-acetylthio-17α-(2-carboxyethyl)-17β-hydroxy-19-norandrost-4-en-3-one lactone.

11. 7α-acetylthio-17α-(2-carboxyethyl)-17β-hydroxy-6α-methylandrost-4-en-3-one lactone.

References Cited in the file of this patent

UNITED STATES PATENTS

| | | |
|---|---|---|
| 2,859,222 | Dodson et al. | Nov. 4, 1958 |
| 2,875,215 | Dodson et al. | Feb. 24, 1959 |
| 2,900,383 | Cella | Aug. 18, 1959 |

UNITED STATES PATENT OFFICE
CERTIFICATE OF CORRECTION

Patent No. 3,013,012                                December 12, 196

John A. Cella et al.

It is hereby certified that error appears in the above numbered patent requiring correction and that the said Letters Patent should read as corrected below.

Column 1, lines 11 and 12, for "or compounds" read -- nor compounds --; column 9, lines 3 and 4, and lines 5 and 6, for "17$\beta$-hydroxandrost-", each occurrence, read -- 17$\beta$-hydroxyandrost- --.

Signed and sealed this 1st day of January 1963.

(SEAL)
Attest:

ERNEST W. SWIDER                                        DAVID L. LADD
Attesting Officer                                           Commissioner of Patents